UNITED STATES PATENT OFFICE.

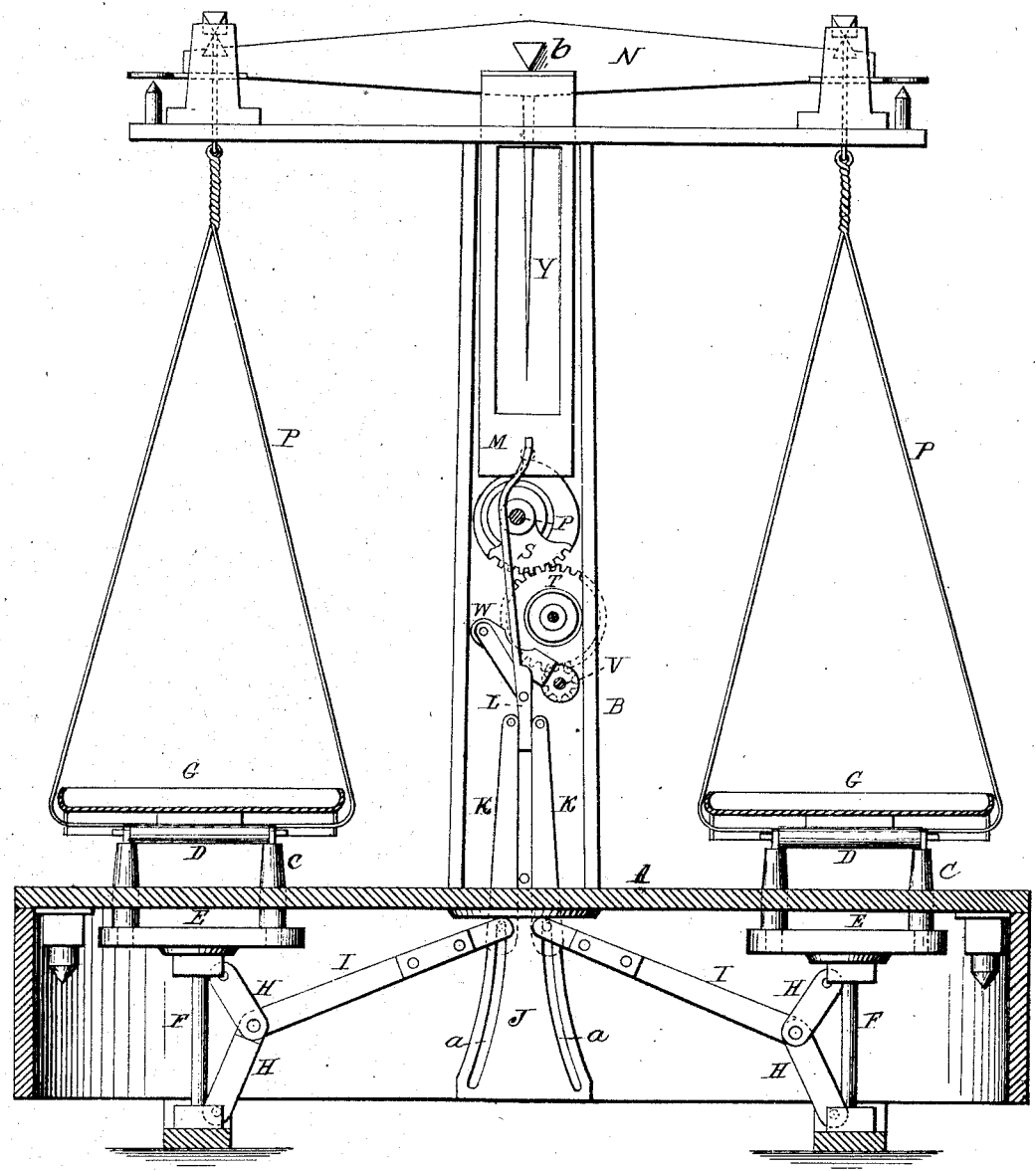

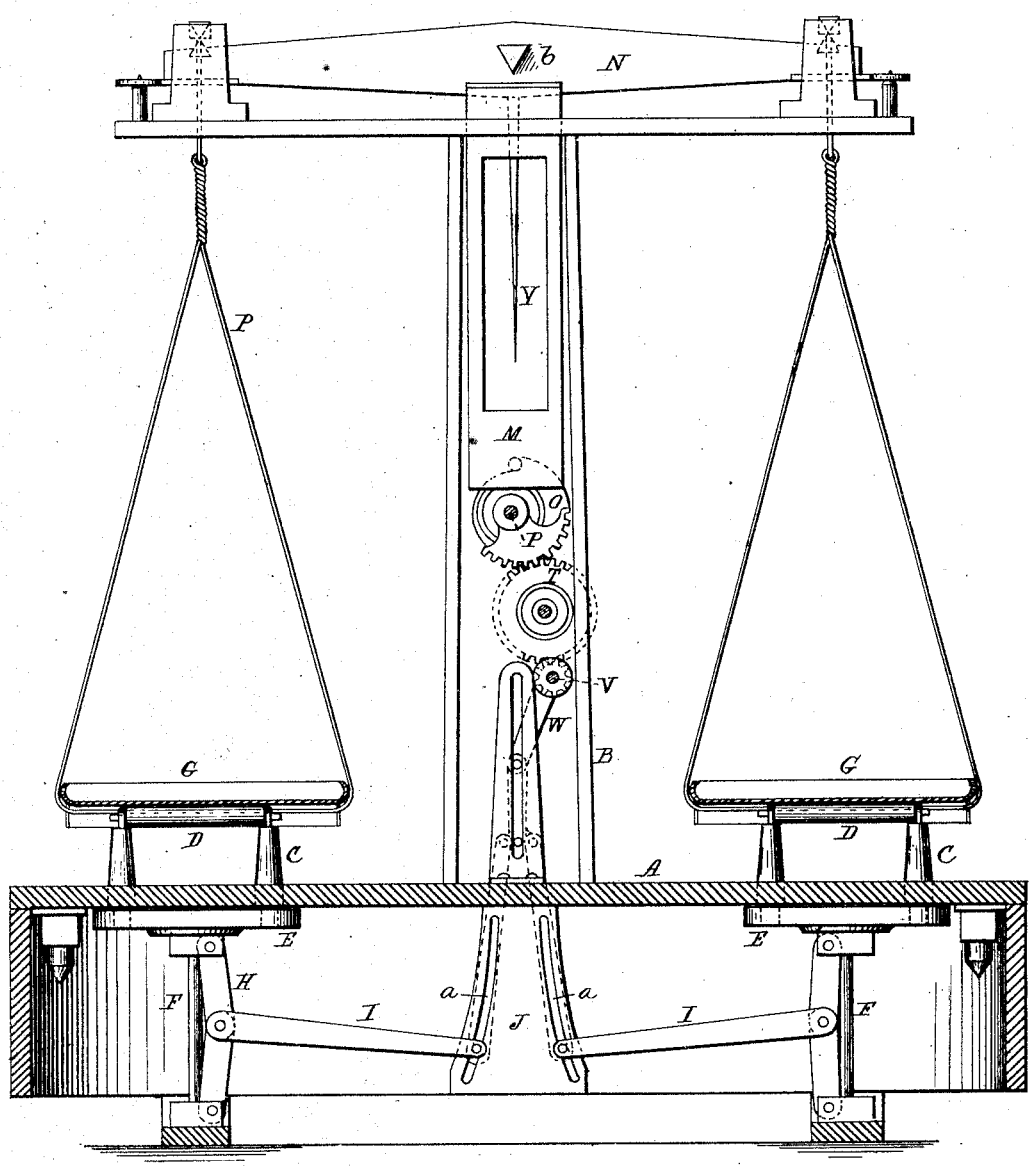

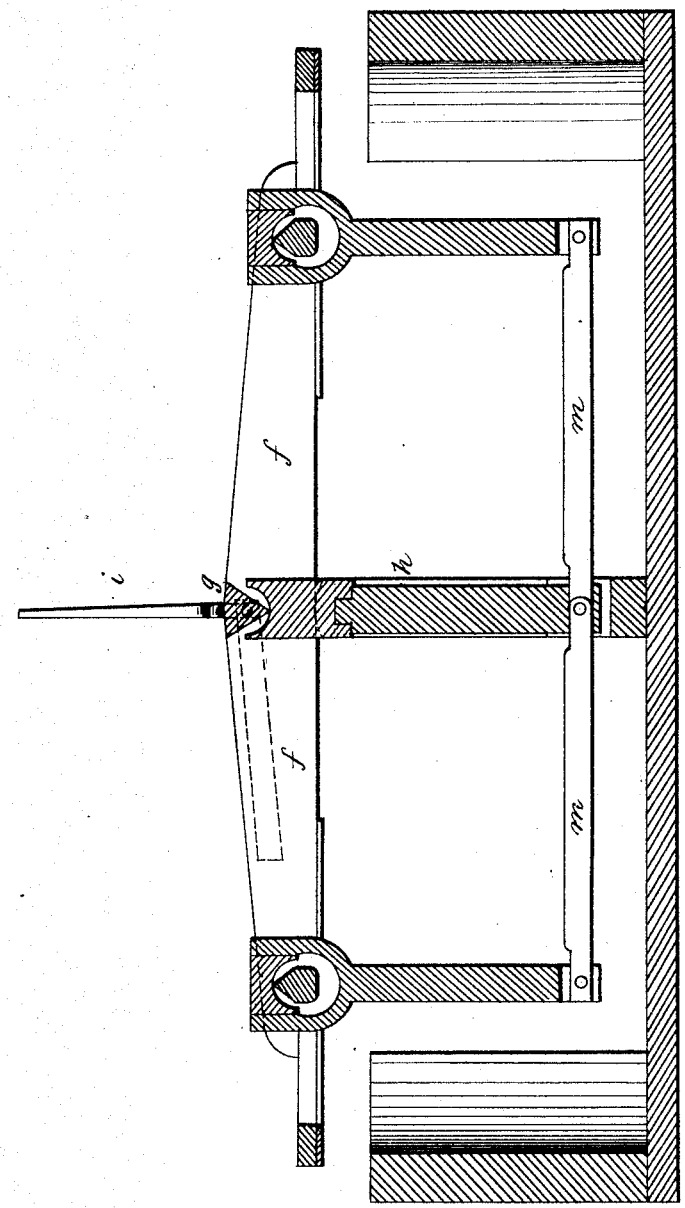

HENRY S. COCHRAN, OF PHILADELPHIA, PENNSYLVANIA.

IMPROVEMENT IN COIN-SCALES.

Specification forming part of Letters Patent No. 161,098, dated March 23, 1875; application filed February 9, 1875.

*To all whom it may concern:*

Be it known that I, HENRY S. COCHRAN, of Philadelphia, in the county of Philadelphia and State of Pennsylvania, have invented certain new and useful Improvements in Scales for Weighing Gold, Silver, and other material, of which the following is a specification:

The object of the present invention is to provide a weighing apparatus for gold, silver, and other materials, which shall combine two separate and distinct scales of a different construction, one serving as a test-scale for the other, and both entirely independent in their action.

The invention consists, first, in the construction of a vertically-movable platform and lever scale, consisting of frames for supporting the pans, a system of toggle-levers, and connected lever-arms, having guides running in curved slots of a pendent plate on the scale-platform, and carrying vertically-movable rods, which are connected with a pointer-rod moving over a scale-dial or index, the pointer-rod being connected with a shaft carrying a pinion meshing into a spur-wheel, which serves to lock a cam employed for throwing an independent scale into action, and also to return the lower scale to its normal position.

The invention also consists in the employment of a beam-scale resting on a central knife-edge, which scale is held in an inoperative position until the weighing operation has been performed on the lower scale, when, by elevating a movable post or plunger through the medium of a cam-shaft, the knife-edge on the beam is caused to be supported by said post. The pans containing the materials being weighed are elevated from the other scale mechanism, and the latter thrown out of operation, the second weighing then taking place on the beam-scale, which serves as a test-scale to indicate any differences of weight.

In the accompanying drawings, Figure 1 is a longitudinal sectional view of a weighing apparatus, showing the position of the parts when the weighing operation is taking place on the knife-edge or beam-scale. Fig. 2 is a similar view, showing the platform or lever scale in position for weighing. Fig. 3 is a modified form of scale employed instead of the lever-scale shown in Fig. 1.

The letter A designates the platform or base-structure of the weighing apparatus, and B is a central vertical column or standard having one or more removable sides to gain access to the interior thereof. Short posts C, operating through the top of the platform, on each side of the center, carry horizontal rollers D at their upper ends, and are connected beneath the platform-top with a board or plate, E, which slides up and down on a stationary guide-stem, F. The frame so formed supports the scale-pan G, which can be readily run on and off from the rollers. Toggle-levers H, connected with the board E and base A, are connected to the lever-frame, which is composed of side arms I and a connecting-bar. To the center of said connecting-bar is secured a plate, which runs in a curved slot, *a*, made in a centrally-located pendent plate, J, attached to the under side of the platform top. The lever-frames of each scale are connected by means of arms K with a vertically-movable rod, L, which carries or is bent to form a pointer running over a suitable scale-dial or index on the column or standard B. M is a movable post or plunger fitted into the top of the column B, and so arranged that when lowered it is removed from contact with the centrally-fulcrumed scale-beam N. When the plunger is raised through the medium of a cam, O, mounted on a horizontal shaft, P, located below the same, the knife-edge *b* on the beam N is caused to rest upon the top of the plunger, so as to enable the beam to vibrate thereon. The suspension-rods P', applied to the ordinary appendages at the ends of the beam, are not secured to the scale-pan, and are of such a length and shape at their lower ends that they will not interfere with the weighing operation taking place on the lower or lever scale, as shown at Fig. 2. The beam-scale is brought into position for testing the correctness of the lower scale by reweighing the materials weighed upon the latter, or in order to indicate any differences of weight by adjusting the plunger through the medium of the cam O. Said cam is locked in position by means of a rack-arm, S, thereon, which meshes into a spur-wheel, T, that in turn gears into a pinion, U, on a shaft, V, carrying an arm, W, connected with the pointer-rod L. Thus it follows that when the plunger M is raised to place the upper or beam scale into an operative position, the rack-arm, spur-wheel, and pinion will tend to depress the lower scale mechanism by acting the pointer, connecting-arms, and lever-frames. The scale-pans, which have already been elevated by the suspension-rods P', are then free to rise and fall. A pointer, Y, projecting downward from the center of the beam serves to indicate the correct weight on a suitable dial.

In Fig. 3 is illustrated a scale to be used instead of the lever-scale, which comprises a frame, $f$, carrying a central knife-bar, $g$, and which rocks upon a bed-bar on posts $h$, and carries a pointer or finger, $i$. Arms at each end of the scale-frame are connected with a longitudinal centrally-pivoted lever, $m$.

By placing the upper beam-scale into an inoperative position when the lower scale is being used, the wear and friction upon the knife-edge on the beam is avoided, as the knife-edge is not in contact with anything. It will also be perceived that by combining two distinct scales, in the manner described, an intimate connection of the two is obtained, one being dependent upon the other for securing the desired result, which is a perfect weighing of all material placed upon the scales.

Having thus described my invention, what I claim as new, and desire to secure by Letters Patent, is—

1. The combination of the vertically-movable scale-pan frames, the toggle-levers, the lever-frames, the vertical arms, and the pointer or finger, substantially as herein described.

2. The combination, in a weighing apparatus, of two independent scales, $b$, and mechanism, substantially as described, for simultaneously throwing one scale into an operative position and the other out of action, substantially as described, for the object stated.

3. The combination of the scale-beam, its knife-edge, the vertically-movable plunger or post, and suitable lifting mechanism therefor, with the suspension-rods and scale-pans, substantially as herein set forth.

4. The combination of the lifting-cam, rack-arm, spur-wheel, and pinion with the movable plunger and the duplex scale mechanism, substantially as herein described.

In testimony that I claim the foregoing I have hereunto set my hand.

HENRY S. COCHRAN.

Witnesses:
GEO. W. CUSHING, Jr.,
A. H. NORRIS.